United States Patent Office 3,184,455
Patented May 18, 1965

3,184,455
ANTHRAQUINONE DYESTUFFS AND PROCESS FOR THEIR PRODUCTION
Rütger Neeff, Leverkusen, Germany, assignor to Farbenfabriken Bayer Aktiengesellschaft, Leverkusen, Germany, a German corporation
No Drawing. Filed July 12, 1961, Ser. No. 123,415
Claims priority, application Germany, July 14, 1960, F 31,664
6 Claims. (Cl. 260—243)

It has been found that valuable anthraquinone dyestuffs are obtained by reacting anthraquinone derivatives carrying a hydroxy group or an amino group in the 1-position and in the 4-, 5- and/or 8-position, an hydroxy, amino or nitro group with aromatic amines of the general formula

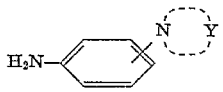

(I)

In this formula, Y denotes the residual constituent of a nitrogen-containing 5- or 6-membered ring, for example an alkylene chain, which may be interrupted by carbonyl groups and/or hetero atoms such as oxygen, nitrogen, sulphur or sulphur dioxide.

The dyestuffs obtained may be characterized by the following formula

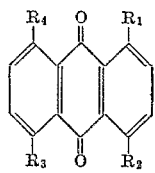

wherein $R_1$, $R_2$, $R_3$ and $R_4$ represent a radical of the formula

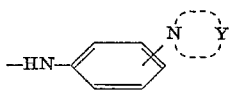

wherein Y denotes the residual constituent of a nitrogen containing 5- or 6-membered ring, whereby said radical is contained once or twice in the anthraquinone molecule, $R_1$ represents furthermore to a member selected from the group consisting of a hydroxy and an amino group, $R_3$ and $R_4$ represents furthermore a member selected from the groups consisting of H, $NO_2$, $NH_2$ and OH and their chlorine and bromine derivatives. Examples of the aromatic amines to be used according to the invention are the sultames of 4-(m- or p-aminophenyl - amino) - butane - sulphonic acid, the N-(m- or p-aminophenyl)-succinimide, -glutarimide or -diglycolic acid imide, N-(m- or p-aminophenyl)-pyrrolidone, 1-(p-aminophenyl) - 1,2,4 - triazole and N-(p- or o-aminophenyl)-morpholine or -thiomorpholine which may carry further substituents such as halogen or alkyl preferably lower alkyl or other non-water-solubilizing groups.

For the reaction there may be used anthraquinones which may carry further substituents in the 5- and 8-position, e.g., halogen atoms, hydroxyl, nitro or possibly substituted amino groups. Examples of such compounds are 1-hydroxy-4-nitro-anthraquinone, 1-methoxy-4-nitro, -4-chloro, or -bromo-anthraquinone, 1,5-dihydroxy-4,8-dinitro- and 1,8-dihydroxy-4,5-dinitro-anthraquinone or mixtures thereof as well as leuco-1,4-dihydroxy-anthraquinone or mixtures of the latter with 1,4-dihydroxy-anthraquinone or leuco-1,4,5,8-tetra-hydroxyanthraquinone.

The reaction of the anthraquinones with the aromatic amines of the general Formula I can be carried out by methods usually applied in anthraquinone chemistry for reactions of this type, for example by reacting hydroxyanthraquinones in admixture with their leuco-compounds or nitroanthraquinones with suitable aromatic amines. The process is preferably carried out in a temperature range between 40° C. and 200° C. and in inert solvents such as alcohols, glycolmonoalkyl ethers, pyridine, nitrobenzene or dimethylformamide.

When leuco-anthraquinones are used for the reaction, the leuco-anthraquinones are subsequently freed from their leuco-hydrogen oxidatively in conventional manner.

If the dyestuffs obtained by the process according to the invention still contain nitro groups, the latter can be reduced to amino groups by means of known reducing reactions. Furthermore, the dyestuffs obtained can be after-halogenated in conventional manner, for example with bromine or sulphuryl chloride in sulphuric acid or organic solvents so that the halogenated dyestuffs preferably contain 0.5–2 halogen atoms per dyestuff molecule.

The new dyestuffs produced according to the invention are preferably suitable for the dyeing of hydrophobic materials such as fibres of cellulose acetate, polyamides and, in particular, aromatic polyesters. Dyeings in red to blue shades are chiefly obtained. Some blue dyestuffs are distinguished by a highly desirable greenish shade which is not obtainable with the known dyestuffs of similar structure. The dyestuffs further possess very good fastness properties, especially a very good fastness to light, washing and sublimation.

The following examples are given for the purpose of illustrating the invention; the parts are parts by weight, unless stated otherwise.

Example 1

(a) 150 parts of 1,5-dihydroxy-4,8-dinitro-anthraquinone and 188 parts of N-(p-aminophenyl)-pyrrolidone in 1500 parts of glycol monoethyl ether are heated to the boil, until the starting material can no longer be detected by paper chromatography. After cooling, the melt is poured into 7500 parts of 10% hydrochloric acid, the precipitated dyestuff filtered off and washed with water. The dyestuff obtained which possesses the formula

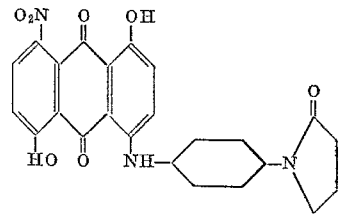

is transformed into a finely dispersed form in known manner, for example by pasting with 80% sulphuric acid, grinding the paste, after washing until neutral, with sulphite-cellulose waste liquor and an alkylnaphthalene-sulphonic acid and subsequent drying.

A dyebath is prepared containing a dispersion of 1 part of the dyestuff described above and 20 parts of cresotic acid methyl ester in 4000 parts of water and adjusted with sulphuric acid to a pH value of 4.5. 100 parts of polyglycol-terephthalate fibres are introduced into the dyebath at 50° C., the bath is heated to 100° C. within 20–30 minutes and kept at this temperature for 1½ hours. After rinsing and drying of the fibre, a very clear greenish blue dyeing is obtained which is distinguished by very good fastness to washing and light and excellent fastness to heat.

If the dyeing process is carried out in the absence of cresotic acid methyl ester at 125° C. for 1–1½ hours, a very clear greenish blue dyeing is likewise obtained which has similar fastness properties.

(b) In a similar manner, a greenish blue dyestuff is obtained from 1,5-dihydroxy-4,8-dinitro-anthraquinone and N-(m-aminophenyl)-pyrrolidone. Instead of 1,5-dihydroxy-4,8-dinitro-anthraquinone there may also be used a mixture of 1,5-dihydroxy-4,8-dinitro- and 1,8-dihydroxy-4,5-dinitro-anthraquinone as well as a mixture of N-(m-aminophenyl)- and N-(p-aminophenyl)-pyrrolidone yielding dyestuffs with a very similar shade.

(c) 15 parts of the dyestuff obtained according to Example 1(a) are dissolved in 185 parts of 100% sulphuric acid, stirred with 5 parts of boric acid and 0.1 part of iodine and treated with 5.2 parts of bromine. The mixture is stirred at 50° C., until a processed dyestuff sample contains about 20–22% of bromine, poured into ice-water mixed with some bisulphite liquor, the precipitated dyestuff is filtered off with suction and dried. The dyestuff, brought into a finely divided form, dyes polyester fibres in intense greenish blue shades. A similar dyestuff is obtained by introducing, instead of bromine, a corresponding amount of chlorine into the sulphuric acid solution.

(d) 15 parts of the dyestuff obtained according to Example 1(a) are heated in 160 parts of o-dichlorobenzene with 0.1 part of iodine and 2.65 parts of bromine to 50° C., until a dyestuff sample contains about 9% of bromine. The o-dichlorobenzene is driven off with steam and the dyestuff isolated in known manner. The dyestuff, brought into a finely divided form, dyes polyester fibres in greenish blue shades and possesses a somewhat better affinity than the non-brominated dyestuff. A dyestuff with similar properties is obtained by replacing the bromine by a corresponding amount of sulphuryl chloride.

(e) 20 parts of the dyestuff obtained according to Example 1(a) and brought into a finely divided form by pasting with 80% sulphuric acid are heated in 800 parts of water with 7 parts of sodium hydroxide and 20 parts of glucose to 90° C. for about 30 minutes, filtered off with suction, washed with water and dried. The dyestuff thus obtained and having the formula

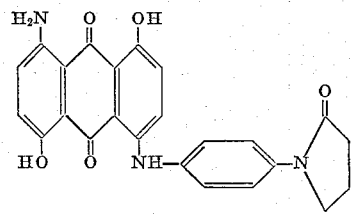

dyes polyester fibres in more reddish shades than the product obtained according to Example 1(a).

(f) 10 parts of the dyestuff produced according to Example 1(a) are heated in 130 parts of o-dichlorobenzene with 0.1 part of iodine and 3.8 parts of bromine to 50° C., until an isolated dyestuff sample contains about 12% of bromine. The o-dichlorobenzene is driven off with steam and the dyestuff isolated in known manner. The dyestuff dyes polyester fibres in intense blue shades.

(g) A dyebath is prepared which consists of a dispersion of 1 part of the dyestuff described in Example 1(a) and 10 parts of a mixture of paraffin-sulphonic acid sodium, oleyl-polyglycol ether and fatty acid-hydroxybenzylamidepolyglycol ether in 4000 parts of water, and 100 parts of a polyamide fibres are introduced into the dyebath at 25° C. The bath temperature is brought to 100° C. within 45 minutes, the bath is kept at this temperature for 1 hour and, after rinsing and drying, a clear intensely greenish blue dyeing with very good fastness properties is obtained.

*Example 2*

10 parts of 1,8-dihydroxy-4,5-dinitro-anthraquinone and 15 parts of N-(p-aminophenyl)-pyrrolidone are heated to the boil in 75 parts of dimethylformamide, until the starting material can no longer be detected by paper chromatography. The reaction mixture is stirred with 750 parts of 10% hydrochloric acid, the precipitated dyestuff filtered off with suction, washed with water and dried. The dyestuff obtained dyes polyester fibres in intense grey-blue shades. It has the following constitution:

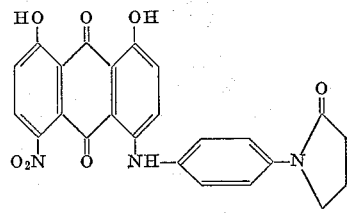

*Example 3*

8 parts of quinizarine, 2.5 parts of leuco-quinizarine and 6 parts of boric acid in 100 parts of ethanol are treated while boiling within about 10 hours with a solution of 8.8 parts of N-(p-aminophenyl)-pyrrolidone in 100 parts of ethanol. Boiling is continued for about 12 hours and the leuco-dyestuff is oxidised, for example by the addition of 3 parts of sodium perborate in 25 parts of water. After cooling, the dyestuff which has crystallized as blue needles is filtered off with suction, washed with ethanol and water, stirred, if necessary, with a strongly diluted sodium hydroxide solution in order to remove small amounts of quinizarine, and isolated in known manner. The dyestuff essentially possesses the following constitution:

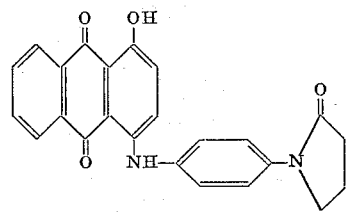

and dyes polyester fibres in fast intensely reddish blue shades. Similar dyestuffs are obtained by using, instead of N-(p-aminophenyl)-pyrrolidone, the m-isomer or derivatives substituted in the aromatic nucleus by halogen, alkyl or alkoxy groups.

*Example 4*

(a) 75 parts of 1,5-dihydroxy-4,8-dinitro-anthraquinone and 154 g. of the sultame of 4-(m-aminophenylamino)-n-butane-sulphonic acid are heated to the boil in 750 parts of glycol monoethyl ether, until the starting material can no longer be detected by paper chromatography. After cooling, the reaction mixture is stirred with 3800 parts of 10% hydrochloric acid, the precipitated dyestuff filtered off with suction, washed with water and dried. The dyestuff obtained which according to analysis possesses the formula

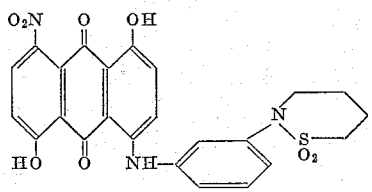

after conversion into the finely divided form, dyes polyamide and polyester fibres in intense greenish blue shades. A similar dyestuff is obtained by using the p-isomer of 4 - (m - aminophenylamino) - n - butane - sulphonic acid instead of the sultame.

(b) 60 parts of the dyestuff obtained according to Example 4(a) and brought into a finely divided form by pasting with 80% sulphuric acid, are heated in 1600 parts of water with 21 parts of sodium hydroxide and 60 parts of glucose to 90° C. for about 30 minutes. The blue reduction product of the formula

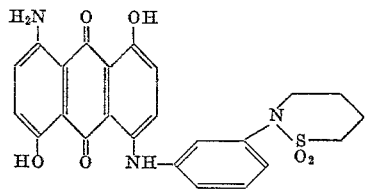

is filtered off with suction, washed with water and dried. The dyestuff dyes polyamide and polyester fibres in intensely greenish blue shades which are even more greenish than the dyeings obtained with the unreduced dyestuff.

(c) 10 parts of the dyestuff produced according to Example 4(b) are heated in 130 parts of o-dichlorobenzene with 0.1 part of iodine and 3.3 parts of bromine to 50–55° C., until an isolated dyestuff sample contains 11–12% of bromine. The o-dichlorobenzene is driven off with steam, the dyestuff filtered off with suction, washed with water and dried. Compared with the dyestuff of Example 4(b), the brominated dyestuff possesses an improved affinity and dyes polyester fibres in somewhat more reddish shades than the unbrominated dyestuff.

*Example 5*

(a) 10 parts of 1,5-dinitro-4,8-dihydroxy-anthraquinone and 35 parts of the sultame of 4-(m-aminophenyl-amino)-n-butane-sulphonic acid are heated in 100 parts of glycol to 190° C., until the starting material can no longer be detected. The reaction mixture is stirred with 500 cc. of 10% hydrochloric acid, filtered off with suction, washed with water and dried. The resulting dyestuff of the formula

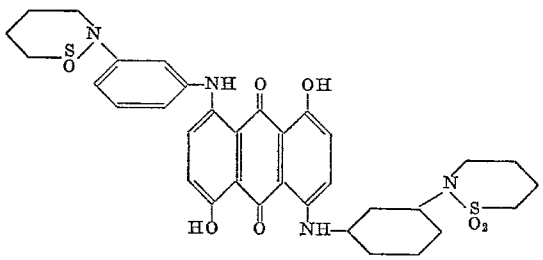

dyes polyamide and polyester fibres in fast greenish blue shades. A dyestuff with similar properties is obtained by using 1,8-dihydroxy-4,5-dinitro-anthraquinone instead of 1,5-dinitro-4,8-dihydroxy-anthraquinone.

*Example 6*

10 parts of 1,8-dihydroxy-4,5-dinitro-anthraquinone and 21 parts of the sultame of 4-(m-aminophenylamino)-n-butane-sulphonic acid are heated to the boil in 100 parts of glycol monoethyl ether, until the starting material can no longer be detected by paper chromatography. The reaction mixture is stirred with 500 parts of 10% hydrochloric acid and, after filtering, washing and drying, a dyestuff of the formula

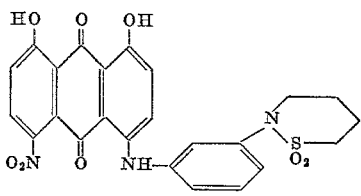

is obtained which dyes polyamide and polyester fibres in intensely greenish blue shades. Similar dyestuffs are obtained by using, instead of the above mentioned sultame, the sultames of N-(2-amino-4-chloro-phenylamino)-, N-(3-amino-4-methylphenylamino)- or N-(4-amino-2,5-dimethoxyphenylamino)-n-butane-sulphonic acid.

*Example 7*

8 parts of quinizarine, 2.5 parts of leuco-quinizarine and 6 parts of boric acid in 190 parts of boiling ethanol are treated with 14 parts of the sultame of 4-(p-aminophenylamino)-n-butane-sulphonic acid within about 8 hours and boiled, until the condensation is completed. The leuco-dyestuff is oxidised, for example by the addition of a solution of 3 parts of sodium perborate in 38 parts of water, the dyestuff is filtered off with suction after cooling, washed with water and, if necessary, stirred with a strongly diluted sodium hydroxide solution, in order to remove any unreacted quinizarine. The resulting dyestuff of the formula

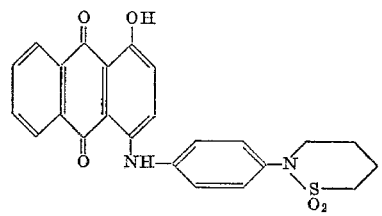

dyes polyamide and polyester fibres in fast violet shades.

*Example 8*

7 parts of leuco-1,4,5,8-tetrahydroxy-anthraquinone, 14 parts of the sultame of 4-(m-aminophenylamino)-n-butane-sulphonic acid and 32 parts of n-butanol are heated to 115° C. for about 10 hours and heated with 125 parts of nitrobenzene and 1.25 parts of piperidine to 150° C. for a further 3 hours. Subsequently, the nitrobenzene is driven off with steam and the dyestuff isolated in known manner. The resulting dyestuff of the formula

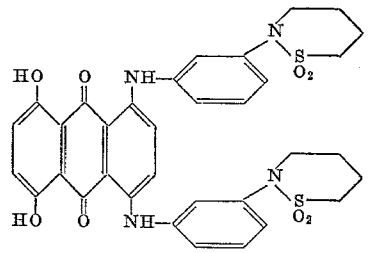

yields intense reddish blue dyeings on polyamide and polyester fibres.

*Example 9*

12 parts of 4,8-dinitro-1,5-dihydroxy-anthraquinone and 22 parts of 1-(4'-aminophenyl)-1,2,4-triazole in 100 parts of glycol monoethyl ether are heated to the boil, until the starting material can no longer be detected chromatographically. The reaction mixture which contains fine blue needles is stirred with 500 parts of 10% hydrochloric acid, the precipitated dyestuff of the formula

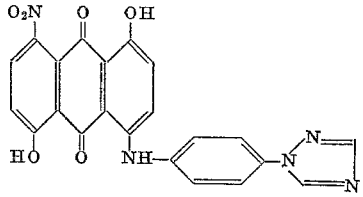

is filtered off with suction, washed and dried. The dyestuff dyes cellulose acetate, polyamide and polyester fibres in intense fast greenish blue shades. By quaternization of the dyestuff with, for example, dimethylsulfate, a water-soluble dyestuff is obtained which dyes polyacrylonitrile fibres in fast blue shades.

Example 10

5 parts of 4,8-dinitro-1,5-dihydroxy-anthraquinone, 5 parts of 4,5-dinitro-1,8-dihydroxy-anthraquinone, 7.5 parts of N-(m-aminophenyl)-succinimide and 7.5 parts of N-(p-aminophenyl)-succinimide in 100 parts of glycol monoethyl ether are heated to the boil, until the reaction is completed. The reaction mixture is subsequently worked up by stirring it into 10% hydrochloric acid. A mixture of dyestuffs of the formulae

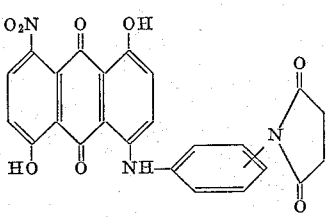

and

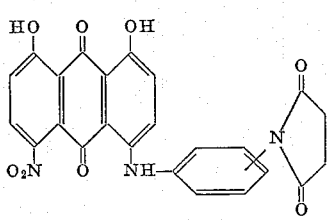

is thus obtained which dye polyamide and polyester fibres in greenish blue shades. When instead of the N-(aminophenyl)-succinimide, the corresponding glutaric acid, diglycolic acid or thiodiglycolic acid imides are used, dyestuffs with similar dyeing properties are obtained.

Example 11

10 parts of 4,8-dinitro-1,5-dihydroxy-anthraquinone and 20 parts of N-(p-aminophenyl)-morpholine in 100 parts of glycol monoethyl ether are heated to the boil, until the starting material can no longer be detected. The reaction mixture is stirred with 500 parts of 10% hydrochloric acid and the resulting dyestuff of the formula

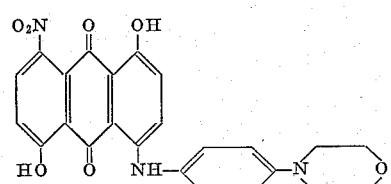

is isolated. The dyestuff dyes polyamide or polyester fibres in an intensely greenish blue shade. Dyestuffs with similar dyeing properties are obtained by using, instead of N-(p-aminophenyl)-morpholine, N-(p-aminophenyl)-thiomorpholine and/or, instead of 4,8-dinitro-1,5-dihydroxy-anthraquinone, 4,5-dinitro-1,8-dihydroxy-anthraquinone.

Example 12

6.5 parts of quinizarine, 4 parts of leuco-quinizarine and 6 parts of boric acid in 60 parts of boiling n-butanol are treated within 8 hours with 10 parts of N-(o-aminophenyl)-morpholine dissolved in 40 parts of n-butanol. The mixture is boiled, until the reaction is completed, the product which crystallizes as olive-brownish prisms is filtered off with suction after cooling, and the leuco-dyestuff is oxidized in 80 parts of n-butanol in the presence of 1 part of piperidine at 100° C. by means of air. The dyestuff crystallizing as large red-blue prisms and having the formula

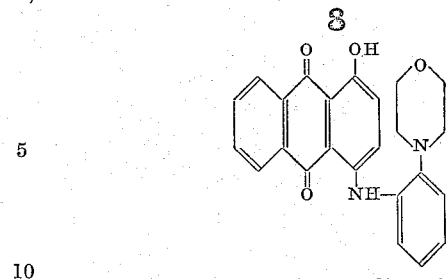

dyes polyamide and polyester fibres in blue-red shades. A dyestuff with similar dyeing properties is obtained by using N-(o-aminophenyl)-piperidine instead of N-(o-aminophenyl)-morpholine.

Example 13

10 parts of 4,8-dinitro-1,5-dihydroxy-anthraquinone and 15 parts of N-(p-aminophenyl)-N-methyl-piperazine in 100 parts of glycol monoethyl ether are heated to the boil, until the reaction is completed. The product is worked up by stirring with dilute hydrochloric acid, and the dyestuff of the formula

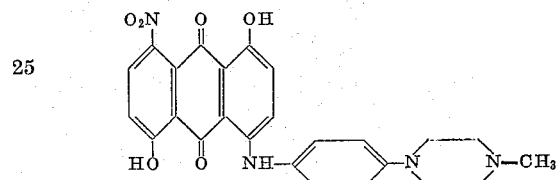

is thus obtained which dyes polyamide and polyester fibres in intense blue shades. By quarternizing the dyestuff with, for example, dimethyl-sulphate, a water-soluble dyestuff is obtained which dyes polyacrylonitrile fibres in fast blue shades.

I claim:

1. A anthraquinone dyestuff of the formula

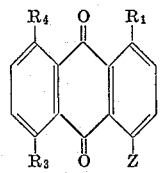

wherein $R_1$ is hydroxyl and Z is a member selected from the group consisting of

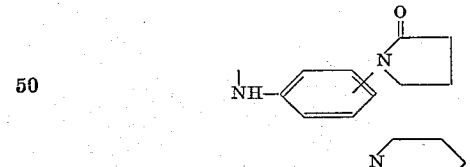

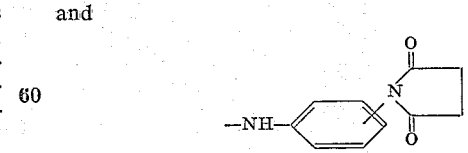

and

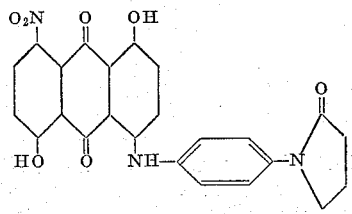

$R_3$ and $R_4$ represents a member selected from the group consisting of nitro, amino, and hydroxyl.

2. A dyestuff of the formula

3. A dyestuff of the formula
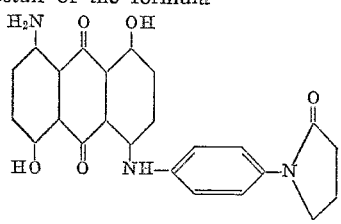
4. A dyestuff of the formula
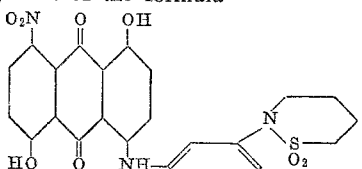
5. A dyestuff of the formula
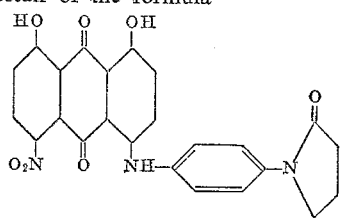
6. A dyestuff of the formula
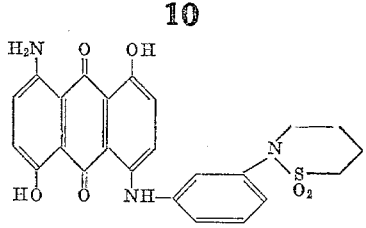
References Cited in the file of this patent
UNITED STATES PATENTS
| | | |
|---|---|---|
| 1,856,802 | Bally et al. | May 3, 1932 |
| 2,147,570 | Berthold et al. | Feb. 14, 1939 |
| 2,153,012 | Tatum | Apr. 4, 1939 |
| 2,185,709 | Ogilvie et al. | Jan. 2, 1940 |
| 2,321,767 | Ogilvie | June 15, 1943 |
| 2,615,021 | Randall et al. | Oct. 21, 1952 |
FOREIGN PATENTS
| | | |
|---|---|---|
| 587,715 | Belgium | June 16, 1960 |
| 798,940 | France | Mar. 14, 1936 |
OTHER REFERENCES
Venkataraman: Chemistry of Synthetic Dyes, volume 1 (1952), page 69.